United States Patent [19]
Bradbury et al.

[11] 3,837,569
[45] Sept. 24, 1974

[54] METRIC CONVERSION RULER

[75] Inventors: Robert C. Bradbury, Closter, N.J.; Joseph H. Sullivan, New York, N.Y.

[73] Assignee: Borden, Inc., Columbus, Ohio

[22] Filed: May 7, 1973

[21] Appl. No.: 358,113

[52] U.S. Cl. ............... 235/70 R, 235/70 C, 235/88, 35/31 E, D52/6
[51] Int. Cl. ......................... G06g 1/02, G06c 3/00
[58] Field of Search............ 235/70 R, 70 A, 78, 84, 235/88; 35/74, 31 A, 31 E; D52/6

[56] References Cited
UNITED STATES PATENTS

| | | | |
|---|---|---|---|
| 2,235,106 | 3/1941 | Hirano | 235/70 R |
| 2,392,877 | 1/1946 | Pym | 235/70 R |
| 2,591,058 | 4/1952 | Gaudier-Pons | 235/70 R |
| 3,146,942 | 9/1964 | Gaudier-pons | 235/70 R |
| 3,685,727 | 8/1972 | Brookes | 235/70 R |
| 3,790,094 | 2/1974 | Zemanek | 235/89 R |

*Primary Examiner*—Stephen J. Tomsky
*Assistant Examiner*—Vit W. Miska
*Attorney, Agent, or Firm*—George P. Maskas; George A. Kap

[57] ABSTRACT

This device for converting British units to metric units and vice versa includes a pair of spaced, rigidly affixed members each provided with a two-cycle logarithmic scale and a slide plate disposed therebetween in a tight, slidable relationship, said slide plate being provided with a plurality of conversion indicia on each side thereof. Each conversion indicia includes a pair of spaced arrows pointing either toward one or the other of said pair of members with the distance between said pair of arrows representing a specific conversion factor which is determined by the distance between numeral "1" on logarithmic scale and the numeral corresponding to the conversion factor.

10 Claims, 2 Drawing Figures

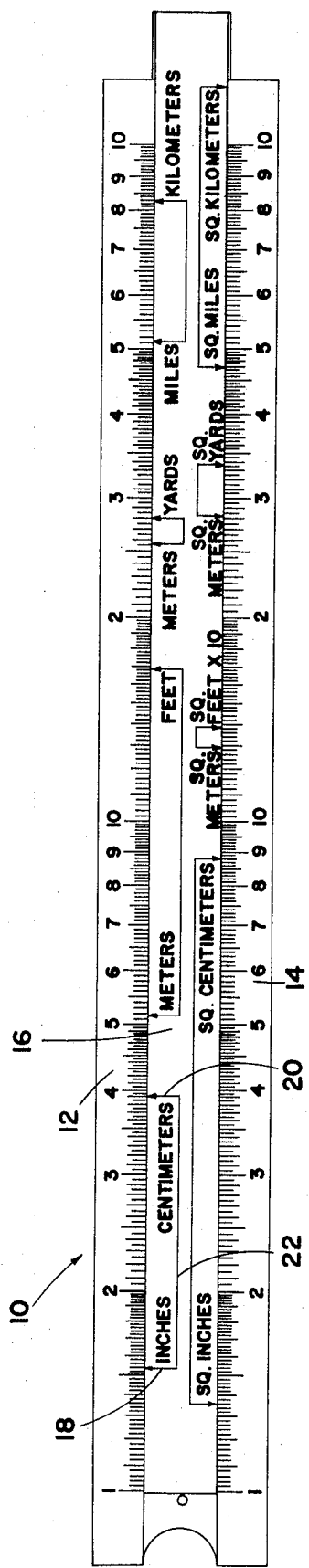

METRIC CONVERSION RULER

This invention relates to a device for performing mathematical conversions from the British system of weights and measures to the metric system and vice versa.

The most common method of performing conversions is to refer to a table which provides a conversion factor and then to multiply or divide the number to be converted by this conversion factor. In an example of converting inches to centimeters, it can be determined from a conversion table that inches are to be multiplied by the conversion factor of 2.54 to obtain centimeters.

The conventional slide rule is well known for its use in performing multiplication and division functions and other mathematical operations. The slide rule can be elongated in the form of an ordinary rule, circular or even spiral. It is well-known that a slide rule can be used for making mathematical conversions from one system to the other by aligning the index of the C scale with a graduation on the D scale corresponding to a conversion factor of 2.54 or any other conversion factor. Once this is done, the hairline of the cursor is aligned with the graduation on the C scale corresponding to the number of inches to be converted to centimeters and the corresponding value, in centimeters, is read on the D scale under the hairline. Accordingly, this method of performing the conversions is, in essence, no different than that described above except that a slide rule is used rather than a pencil and paper. With any method used, the proper conversion factor must be determined. Although conversion with a slide rule is much quicker, it still suffers the disadvantage that the conversion factor must be known before any conversion can be made.

A number of slide rule-type mechanical devices are available for performing conversions as illustrated by the Warner U.S. Pat. No. 3,544,768 and the Brookes U.S. Pat. No. 3,685,727. Such devices include indicia which are related to the imprinted scales. By aligning the indicia with graduated scales in a specific fashion, the desired conversion can be made. Operation of such devices is unnecessarily complicated by the sequence of steps which may require aligning of a pair of cooperating scales and the reference to one scale followed by a read-out on another, or the necessity to refer to a table in order to determine the meanining of a symbol imprinted on the device.

The device or conversion ruler described and claimed herein is extremely simple to operate and gives instant conversion of multiple units. Its basic embodiment includes a stationary, logarithmic scale and a sliding or rotatable element which has plurality of conversion indicia thereon. The conversion indicia can take the form of a pair of spaced arrows connected by a line. The particular conversion unit is imprinted next to the arrow to indicate what unit is being converted and what units are desired. The conversion indicia can be located anywhere on the slidable element and this adds versatility to the device in that 60 or more conversions can be provided on an ordinary conversion ruler.

The distance between a pair of arrows is a measure of the conversion factor as shown on a logarithmic scale. This distance must be very accurately measured since conversion of the various units is directly affected thereby. In the case of converting inches to centimeters, the conversion factor is 2.54, i,e., there are 2.54 centimeters per inch. If it is desired to provide for conversion of inches to centimeters or vice versa, the distance between 1 and 254 on the logarithmic scale is measured in any convenient manner, as by an ordinary ruler, and transferred anywhere on the slidable element. The distance is demarcated by a pair of spaced arrows, the left arrow is designated "inches" or any contraction thereof while the right arrow is designated "centimeters" or any contraction thereof. Other conversions can be provided on the same or opposite edges of the slidable element in the same fashion as for inches-centimeters using an appropriate conversion factor.

In the preferred embodiment, a medial slidable element is disposed between a pair of spaced stationary planar members. The inner edge of each member is imprinted with back to front two-cycle logarithmic scales. The slidable element has a plurality of conversion indicia for converting various units of weights and measures from the British system to the metric system and vice versa. The conversion indicia includes a pair of spaced arrows pointing towards a scale on one of the stationary members connected by a line with a unit imprinted adjacent each arrow. Optionally, the slidable element has imprinted on the outside edges a pair of back to front logarithmic scales which can be used in connection with the logarithmic scales on the stationary members to carry out the various mathematical computations.

To accomplish a conversion from one system to another, all that is needed is to select appropriate conversion indicia, align the appropriate arrow with the number of units desired to convert in one system to the units in the other system at a point aligned with the other arrow of the conversion indicia.

For a more complete understanding of the nature of the invention, reference is here made to the following detailed description taken in connection with the accompanying drawing wherein:

FIG. 1 is a plan view of the conversion device with a pair of spaced stationary members imprinted with logarithmic scales on their inner edges and a slidable medial element interposed between the stationary members and having conversion indicia imprinted on its outer edges; and FIG. 2 is a planar view of the slidable element showing the side opposite from the one illustrated in FIG. 1.

Referring now to the drawings, and to FIG. 1 in particular, there is shown a conversion ruler 10 which includes an upper elongated plate 12, a lower elongated plate 14 and a medial slide plate 16 interposed between the upper and the lower plates. The upper and the lower plates are spaced to accommodate the slide plate and are rigidly interconnected so that they are movable in unison relative to the slide plate 16, and vice versa. The inner edges of the upper and lower plates are provided with two-cycle logarithmic scales in directly opposing relationship so that a hairline registered on a numeral on the lower scale will be in alignment with the same numeral on the upper scale. It should be understood that the plates can be imprinted with one, two or three cycle logarithmic scales, or as many as desired. In the preferred embodiment, however, a two-cycle log scale is used.

Slide plate 16 corresponds to the slide in a conventional slide ruler in that it is positioned, constructed and assembled in a similar manner and can have the same scales imprinted thereon. In the preferred embodiment, however, the scales on the slide plate 16 are omitted in order to provide more space for the conversion indicia, which will be more fully described below. When the scales are provided on the slide plate 16, as in a conventional slide ruler, the conversion ruler then can operate as a slide ruler and for this reason, a slide rule cursor with a vertical hairline is provided to facilitate mathematical operations.

The essential aspect of the conversion device resides in the conversion indicia which is provided on the slide plate 16. As shown in FIGS. 1 and 2, the slide plate is provided with a plurality of conversion indicia each including a pair of spaced arrows 18, 20 connected by line 22 at their ends and having the various units of weights and measures imprinted adjacent each arrow. Some of the arrow pairs point towards upper plate 12 and others, towards the lower plate 14.

Shown in FIG. 1 is conversion indicia at the upper extreme left of the conversion ruler where adjacent one arrow the word "inches" is imprinted and adjacent the other arrow connected by line 22, the word "centimeters" appears. As should be apparent by now, this particular conversion indicia can be used to effect conversion from inches to centimeters and from centimeters to inches. Conversion is accomplished in a facile manner by aligning an arrow with a number on the upper plate if the arrow points upwardly or the lower plate, if the arrow points downwardly. This number corresponds to the number in units indicated adjacent the arrow. The conversion is taken directly opposite the other arrow in units indicated alongside that arrow. For instance, if it is desired to convert 5 inches to centimeters, the arrow adjacent "inches" is aligned with numeral "5" on the upper plate 12 and the answer of 12.7 centimeters is read on the plate 12 at a point indicated by the other arrow which has the word "centimeters" along its side. To convert 5 centimeters to inches, align the "centimeter" arrow with numeral "5" and read-off the answer of 1.97 inches on plate 12 indicated by the "inches" arrow.

As shown in the drawings, the conversion indicia can be randomly oriented on the slide plate but logic dictates that some orderly arrangement be preserved. For instance, it is prefered to arrange the length conversions separately from volume conversions, etc.

The distance between a pair of connected arrows is critical since it represents the conversion factor for the particular units involved. The distance is determined by linearly measuring the distance between numeral "1" on either plate 12 or 14 and the number representing the conversion factor. For converting inches to centimeters, the conversion factor is 2.54 and this linear distance between "1" and "254" on the logarithmic scale is used to set-off the "inches" arrow and the "centimeters" arrow. The units on the left is the unit which is being converted into units on the right and vice versa. An appropriate conversion factor must be used in converting inches to centimeters and other units. Since "inches" is imprinted on the left side of the indicia, the appropriate conversion factor is 2.54 whereas if it were desired to transpose "centimeters" and "inches" on the slide plate, then the arrows would be spaced the linear distance between numerals "1" and "394" on the logarithmic scale. The reason for this spacing being that the conversion factor for centimeters to inches is 0.394.

Since it is possible to obtain the desired conversion regardless of whether "inches" or "centimeters" appear on the left side of the conversion indicia, although the spacing between the arrows will be different depending on which is where, the controlling criterion would generally be the linear distance between the arrows which represents the conversion factor. For instance, if a certain conversion factor is 7.6, the arrows will be spaced the linear distance between "1" and "76" on the logarithmic scale whereas the inverse of the conversion factor 7.6 is 0.1316, which represents a much smaller distance on the log scale. In such an instance, the units would be place in such and arrangement that the conversion factor of 0.1316 would be used since it would position the cooperating arrows closer together thus making it easier to work with.

In using this conversion ruler, one should know for instance, that an inch is a larger dimension than a centimeter so that when a conversion factor of 2.54 is read from the conversion ruler, one knows that the decimal belongs between "2" and "5." For example, to convert 5 inches to centimeters, a value of "127" is read off the conversion ruler. Since 1 inch equals 2.54 centimeters, correct placement of the decimal point results in the conversion value for 5 inches of 12.7 centimeters.

If one is not certain what the conversion factor is, this can be easily determined with the conversion device by aligning arrow 18 with numeral "1" on plate 12 and reading off the answer opposite arrow 20. It is apparent that one should have an idea of the relative values to place the decimal point where it belongs in order to obtain 2.54 and not 0.254 or something else as the conversion factor of inches to centimeters.

In relation to other conversion devices examined, it is unbelievable how simple is the instant device in construction and operation. No additional instruments are needed other than a pair of hands. Furthermore, conversion of multiple units is accomplished by a single adjustment of the slide plate. There is no necessity to first obtain the conversion factor and then perform another operation to get the conversion. There is also no need to refer to any reference tables for information describing what scale to use or what indicia to align for a particular conversion. With the conversion device described herein, it is possible to provide for over 60 different conversions from the metric to the British system and vice versa.

We claim:

1. A conversion device for converting in one operation single and multiple units of one system to units of another system, and vice versa, comprising a first and a second relatively movable members, said first member having a logarithmic scale thereon and said second member having conversion indicia randomly disposed thereon including a first and a second spaced indicia marks, with said first indicia mark being disposed to the left of said second indicia mark, said first indicia mark is associated with a representation of units of said one system whereas said second indicia mark is associated with a representation of units of said another system, the distance between said indicia marks represents the conversion factor for units in said one system to units of said another system and equals the linear distance on logarithmic scale between numeral "1" and the numeral corresponding to said conversion factor.

2. Conversion device of claim 1 wherein said one system is the British system of weights and measures and said another system is the metric system of weights and measures.

3. Conversion device of claim 2 including a plurality of conversion indicia randomly disposed on said second member for converting various units in British system to the corresponding units in the metric system, and vice versa, with said first and second marks being separated by an appropriate conversion factor, each conversion indicia including a line connecting said first and said second indicia marks.

4. Conversion device of claim 3 including a third member having logarithmic scale thereon and being ridgidly affixed to said first member, said second member being disposed between said first and third members and being relatively movable thereto.

5. Conversion device of claim 4 wherein said first, second and third members are elongated and are disposed parallel to each other with said third member disposed slidably between said first and second members.

6. Conversion device of claim 4 wherein said first and said third members each have a two-cycle logarithmic scale thereon, said scales being in alignment with each other.

7. Conversion device of claim 6 wherein some of said conversion indicia is provided on the lower edge of said second member and thereby facing the first member whereas other conversion indicia is provided on the upper edge of said second member facing said third member.

8. Conversion device of claim 7 wherein said second member includes conversion indicia on its lower and upper edges on its reverse side, said second member being disposed between said first and third member in a tight slidable fit and being retractable out of engagement with said first and second members so that it can be reversed.

9. Conversion device of claim 8 wherein some of said conversion indicia is arranged in spaced relationship and others, in superimposed relationship, said representation of units is an imprint of the unit or its contration.

10. Conversion device of claim 9 wherein each of said indicia marks is an arrow pointing to the corresponding member and said representation of units is disposed adjacent each of said arrows and consists of letters indiciating a specific unit.

* * * * *